(12) United States Patent
Janca et al.

(10) Patent No.: US 7,471,006 B2
(45) Date of Patent: Dec. 30, 2008

(54) APPARATUS AND METHOD FOR GENERATING ELECTRIC POWER FROM A SUBSURFACE WATER CURRENT

(75) Inventors: Phillip Todd Janca, Wichita Falls, TX (US); Phillip Paul Janca, Olney, TX (US)

(73) Assignee: Gulfstream Technologies, Inc., Olney, TX (US)

( * ) Notice: Subject to any disclaimer, the term of this patent is extended or adjusted under 35 U.S.C. 154(b) by 184 days.

(21) Appl. No.: 11/519,607

(22) Filed: Sep. 12, 2006

(65) Prior Publication Data
US 2008/0296899 A1    Dec. 4, 2008

Related U.S. Application Data (60) Provisional application No. 60/716,063, filed on Sep. 12, 2005.

(51) Int. Cl.
    *F03B 13/10* (2006.01)
(52) U.S. Cl. .......................... 290/43; 290/54
(58) Field of Classification Search ............ 290/42, 290/43, 53, 54; 415/1, 4.2
    See application file for complete search history.

(56) References Cited

U.S. PATENT DOCUMENTS

| 3,978,345 | A |   | 8/1976  | Bailey |        |
|-----------|---|---|---------|--------|--------|
| 4,026,587 | A |   | 5/1977  | Hultman et al. | |
| 4,205,943 | A |   | 6/1980  | Vauthier | |
| 4,256,970 | A | * | 3/1981  | Tomassini ............... | 290/53 |
| 4,274,009 | A |   | 6/1981  | Parker, Sr. | |
| 4,292,535 | A | * | 9/1981  | Diggs ............... | 290/54 |
| 4,306,157 | A |   | 12/1981 | Wracsaricht | |
| 4,313,059 | A |   | 1/1982  | Howard | |
| 4,335,319 | A | * | 6/1982  | Mettersheimer, Jr. ........ | 290/54 |
| 4,383,182 | A |   | 5/1983  | Bowley | |
| 4,520,273 | A |   | 5/1985  | Rowe | |
| 4,850,190 | A |   | 7/1989  | Pitts | |
| 5,230,215 | A |   | 7/1993  | Nagata | |
| 5,324,988 | A |   | 6/1994  | Newman | |
| 5,440,176 | A |   | 8/1995  | Haining | |
| 5,798,572 | A |   | 8/1998  | Lehoczky | |
| 6,091,161 | A |   | 7/2000  | Dehlsen et al. | |
| 6,104,097 | A |   | 8/2000  | Lehoczky | |
| 6,109,863 | A | * | 8/2000  | Milliken ............... | 415/1 |
| 6,531,788 | B2 |   | 3/2003  | Robson | |
| 6,688,925 | B2 |   | 2/2004  | Garcia | |
| 6,734,576 | B2 |   | 5/2004  | Pacheco | |
| 6,800,955 | B2 |   | 10/2004 | McDavid, Jr. | |
| 6,856,036 | B2 |   | 2/2005  | Belinsky | |
| 7,307,356 | B2 | * | 12/2007 | Fraenkel ............... | 290/54 |
| 2003/0066934 | A1 | | 4/2003 | Bolonkin | |
| 2004/0070210 | A1 | | 4/2004 | Johansen et al. | |
| 2004/0189010 | A1 | | 9/2004 | Tharp | |
| 2004/0201223 | A1 | | 10/2004 | Grinsted et al. | |
| 2005/0132700 | A1 | | 6/2005 | Newman | |

OTHER PUBLICATIONS

Fraenkel, P., *Marine Current Turbines: feedback on experience so far*, 2004, 32 pages.

(Continued)

*Primary Examiner*—Nicholas Ponomarenko
(74) *Attorney, Agent, or Firm*—Maginot, Moore & Beck, LLP (57) ABSTRACT

The present invention is a system for generating power using water current. In one embodiment, a subsurface power generating system includes a first power generating node, with at least one cross-flow turbine, at least one universal gear coupled to the at least one cross-flow turbine, at least one modular generator; and at least one clutch for engaging and disengaging the at least one modular generator and the at least one universal gear.

10 Claims, 6 Drawing Sheets

OTHER PUBLICATIONS

Nortek As: *Aquadopp® Open Water 3D Current Meter*, 2004, 4 pages.

Segergren, E., *Direct Drive Generator for Renewable Power Conversion from Water Currents*, 2005, 46 pages.

Fraenkel, P., *Marine Current Turbines™; progress with tidal turbine development*, 2005, 6 pages.

International Water Power: *Kite soars to new depths*, 2006, 7 pages.

International Water Power: *Stream of developments*, 2006, 9 pages.

* cited by examiner

APPARATUS AND METHOD FOR GENERATING ELECTRIC POWER FROM A SUBSURFACE WATER CURRENT

This application claims the benefit of provisional U.S. Patent Application No. 60/716,063, filed on Sep. 12, 2005.

FIELD OF THE INVENTION

The present invention relates generally to the field of hydroelectric power generation, and, more particularly, to an apparatus and method for generating electric power from a subsurface water current.

BACKGROUND

The wealth of the United States has been created largely through the exploitation of cheap energy provided by the past abundance of fossil fuels. Because of the increasing shortages of natural gas in North America, the continued reliance on oil suppliers located volatile regions, the approaching worldwide shortages of oil, and because of the growing danger of global warming that may be caused by the combustion of fossil fuels, clean reliable sources of renewable energy are needed.

Many of the efforts to develop power generation systems fueled by renewable energy sources have been focused on wind energy. Although wind powered generating systems provide many benefits, they have a significant drawback. Specifically, wind direction and speed are in a constant state of flux. Wind speeds can fluctuate hourly and have marked seasonal and diurnal patterns. They also frequently produce the most power when the demand for that power is at its lowest. This is known in the electricity trade as a low capacity factor. Low capacity factors, and still lower dependable on-peak capacity factors, are notable shortcomings of wind power generation.

In contrast to the winds, some deep ocean currents are driven largely by relatively steady Coriolis forces. The fact that such ocean currents are not subject to significant changes in direction or velocity makes sub-sea power generation somewhat more desirable than the intermittent power produced by wind-driven turbines. The book, Ocean Passages of the World (published by the Hydrographic Department of the British Admiralty, 1950), lists 14 currents that exceed 3 knots (3.45 mph), a few of which are in the open ocean. The Gulf Stream and the Kuro Shio are the only two currents the book lists having velocities above 3 knots that flow throughout the year. Both of these currents are driven by the Coriolis force that is caused by the Earth's eastward rotation acting upon ocean currents produced by surface trade winds. Because these currents are caused largely by the Earth's rotation, they should remain constant for a substantial period barring significant changes in local geography.

The Gulf Stream starts roughly in the area where the Gulf of Mexico narrows to form a channel between Cuba and the Florida Keys. From there the current flows to the northeast through the Straits of Florida, between the mainland of the United States and the Bahamas, flowing at a substantial speed for some 400 miles. The peak velocity of the Gulf Stream is achieved off of the coast of Miami, Fla., where the Gulf Stream is about 45 miles wide and 1,500 feet deep. There, the current reaches speeds of as much as 6.9 miles per hour at a location between Key Largo, Fla. and North Palm Beach, Fla., and less than 18 miles from shore. Farther along it is joined by the Antilles Current, coming up from the southeast, and the merging flow, broader and moving more slowly, continues northward and then northeastwardly, as it roughly parallels the 100-fathom curve as far as Cape Hatteras, N.C.

The Kuro Shio is the Pacific Ocean's equivalent to the Gulf Stream. A large part of the water of the North Equatorial current turns northeastward east of Luzon and passes the east coast of Taiwan to form this current. South of Japan, the Kuro Shio flows in a northeasterly direction, parallel to the Japanese islands, of Kyushu, Shikoku, and Honshu. According to Ocean Passages of the World, the top speed of the Kuro Shio is about the same as that of the Gulf Stream. The Gulf Stream's top flow rate is 156.5 statute miles per day (6.52 mph) and the Kuro Shio's is 153 statute miles per day (6.375 mph).

Other possible sites for the underwater generators are the East Australian Coast current, which flows at a top rate of 110.47 statute miles per day (4.6 mph), and the Agulhas current off the southern tip of South Africa, which flows at a top rate of 139.2 statute miles per day (5.8 mph). Another possible site for these generators is the Strait of Messina, the narrow opening that separates the island of Sicily from Italy, where the current's steady counter-clockwise rotation is produced primarily by changing water densities resulting from evaporation in the Mediterranean. Oceanographic current data may suggest other potential sites.

Submersible turbine generating systems can be designed to efficiently produce power from currents flowing as slowly as 3 mph—if that flow rate is consistent—by increasing the size of the turbines in relation to the size of the generators, and by adding more gearing to increase the shaft speeds to the generators. Because the Coriolis currents can be very steady, capacity factors of between 70 percent and 95 percent may be achievable. This compares to historical capacity factors for well-located wind machines of between 23 percent and 30 percent. Because a well-placed submersible water turbine will operate in a current having even flow rates, it may possible for it to produce usable current practically one hundred percent of the time.

Moreover, increasing human ingress into the oceans makes undersea power generation desirable. Historically, submarines have had to periodically surface and dock at shore based ports for maintenance that has included recharging or replacing electric batteries and/or receiving temporary electric power during the maintenance of their on-board generators. Such needs to periodically travel to shore based facilities have undesirably limited the mission capabilities of many submarines. A suitable deep sea power generation facility could provide opportunities for submarines to obtain electric power for maintenance while remaining submerged and without diversion from the open ocean to a shore location. Additionally, as the number of underwater scientific observatories increases, so does the need to generate power for the observatories at the observatory sites. Further, whether engaged in military, scientific, commercial, or recreational activities humans need potable water. Potable water can be produced from sea water, but such production facilities typically require electricity.

Although the needs are numerous, viable sub-sea power generation has presented notable challenges. For example, rotating electric generators produce heat. The electric current flowing through the conductors, both in the stator and rotor, produces heat because of the electrical resistance. In addition, heat is generated in the steel of the rotor armature core by the changing magnetic fluxes and bearing, shaft, and gear friction produces heat as well. Although the heat loss in large generators is typically only on the order of about 1 percent of output, this is still considerable. For example, a pair of generators producing 1,200 kW might have a loss of 12 kW, which is equivalent to 40,973 BTU per hour. Therefore, a liquid cooling system is desirable for dissipation of heat produced by a sub-sea power generation system. Additionally, maintaining proper horizontal, vertical, and azimuthal turbine positioning relative to ocean current depths and directions for optimizing capacity factors in operation of sub-sea power generation systems has been challenging. Another challenge has been that deeply submerging power generation units has made them less readily accessible for servicing and repair.

SUMMARY

A subsurface power generation system and method of operation is disclosed. In one embodiment, a subsurface power generating system includes a first power generating node, with at least one cross-flow turbine, at least one universal gear coupled to the at least one cross-flow turbine, at least one modular generator; and at least one clutch for engaging and disengaging the at least one modular generator and the at least one universal gear.

In an alternative embodiment, the present invention provides a submersible station for generating electric power from a subsurface water current. The station includes a frame with a first vertical support member, a second vertical support member, and a third vertical support member. A first electric generator includes a first generator stator coupled to the first vertical support member, and a first generator rotor positioned to rotate about the first generator stator. A second electric generator includes a second generator stator coupled to the second vertical support member, and a second generator rotor positioned to rotate about the second generator stator. The station further includes a first plurality of louver panels coupled to the first generator rotor and extending generally radially outwardly from the first vertical support member and a second plurality of louver panels coupled to the second generator rotor and extending generally radially outwardly from the second vertical support member. A microprocessor is configured to control the first plurality of louver panels to open and close based upon a first position signal corresponding to the rotational position of the first plurality of louver panels and to control the second plurality of louver panels to open and close based upon a second position signal corresponding to the rotational position of the second plurality of louver panels.

In another alternative embodiment, the present invention provides a method for generating electric power from a subsurface water current. The method includes controlling opening and closing of a plurality of louver panels in response to at least a velocity of the water current and coupling a rotor of an electric generator to the louver panels.

The above-noted features and advantages of the present invention, as well as additional features and advantages, will be readily apparent to those skilled in the art upon reference to the following detailed description and the accompanying drawings, which include a disclosure of the best mode of making and using the invention presently contemplated.

DETAILED DESCRIPTION

Like reference numerals refer to like parts throughout the following description, the accompanying drawings, and the claims.

Figure 1:
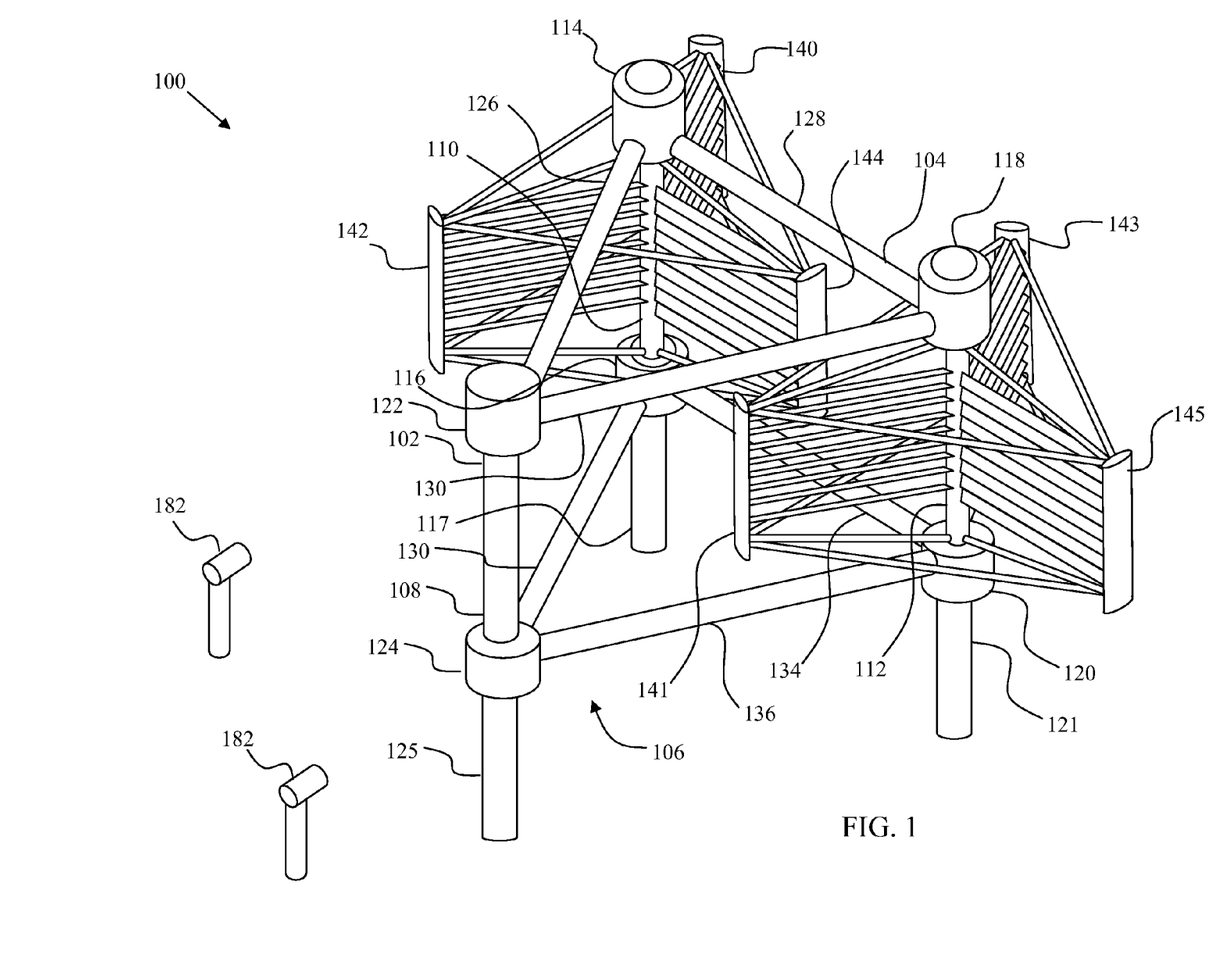
FIG. 1 shows a perspective view of an exemplary manned subsurface electric power generation station in accordance with principles of the present invention.

FIG. 1 shows a perspective view of an exemplary sub-sea electric power generation station 100 according to the present invention. The station 100 is designed to operate 24 hours per day and 365 days per year while totally submerged to supply power to an onshore power grid through an umbilical (not shown). The station 100 is marine creature, biomass, and navigational friendly, and is suitable for, among other locations, geographic locations where fairly constant, vector specific sub sea currents are present. It should be appreciated that there are numerous worldwide locations (e.g., North American Gulf Stream areas such as the Florida, Georgia, and South Carolina coasts, among others) where constant, vector specific, sub-sea currents can be harnessed to generate electricity. In addition to the ability to generate electrical energy, the station 100 is capable of producing significant quantities of potable water.

The station 100 includes a neutrally buoyant, manned, one atmosphere, frame 102. The frame 102 includes a generally horizontally oriented upper triangularly shaped pressure resistant structure 104, a generally horizontally oriented lower triangularly shaped pressure resistant structure 106, and three substantially hollow generally vertically oriented legs or "spars" (a first spar 108, a second spar 110, and a third spar 112) extending between the structure 104 and the structure 106.

The triangularly shaped structures 104 and 106 and the spars 108, 110 and 112 are generally cylindrical in construction and manufactured to appropriate standards such as American Society of Mechanical Engineers (ASME) standards for a pressure vessel for human occupancy (PVHO-2, section VIII, Division I), National Board, American Bureau of Shipping (ABS) and U.S. Coast Guard (USCG) standards. The frame 102 is configured to be neutrally buoyant. Neutral buoyancy may be achieved by a variety of combinations of water displacement by the station 100 and permanent and variable buoyancy including the use of "hard" and "soft" ballast tanks and syntactic foam.

The upper triangular structure 104 in this embodiment provides living quarters similar to those found onboard a merchant vessel including berthing quarters, restrooms, showers, common rooms, off duty rooms, food preparation and storage areas, a small infirmary, a communication and media room, an exercise area, etc. Additionally, the upper triangular structure 104 provides a storage area for emergency equipment such as an emergency escape pod and a one atmosphere absolute transfer-under-pressure (One ATATUP) module.

The lower triangular structure 106 provides additional space for storage and equipment. By way of example, water generators (either reverse osmosis ("R/O") or distilling type), a sanitary station, water heaters, control equipment, fire suppression systems ("FSS"), a decompression chamber, a diver lock out compartment ("DLOC"), remote vehicle lock out ports ("ROVLOCs"), air chargers and environmental control units ("ECU") are provided with the station 100. The environmental control units include oxygen generators, scrubbers and burners. The lower triangular structure 106 further houses tanks for the storage of potable water, pressurized air and oxygen and one or more heat exchanger systems for thermal cooling of rotating machine parts and for using the heat generated by the machine parts to heat the station. Additionally, a battery provides a back-up power supply in case power generation is disrupted and the power grid is not available.

The station 100 includes six nodes. Nodes 114 and 116 are joined by the spar 110, nodes 118 and 120 are joined by the spar 112 and nodes 122 and 124 are joined by the spar 108. Six additional spars further join the various nodes. Specifically, along the upper structure 104 spar 126 joins nodes 122 and 114, spar 128 joins nodes 114 and 118, and spar 130 joins nodes 118 and 122. Along the lower structure 106 spar 132 joins nodes 124 and 116, spar 134 joins nodes 116 and 120, and spar 136 joins nodes 120 and 124. Each of the passageways between the nodes and the spars may be sealed by a watertight door (not shown) to isolate the various areas in case of flooding or other emergency. The nodes 116, 120 and 124 are secured to pylons 117, 121 and 125, respectively. The pylons 117, 121 and 125 are anchored in the seafloor.

Figure 2:
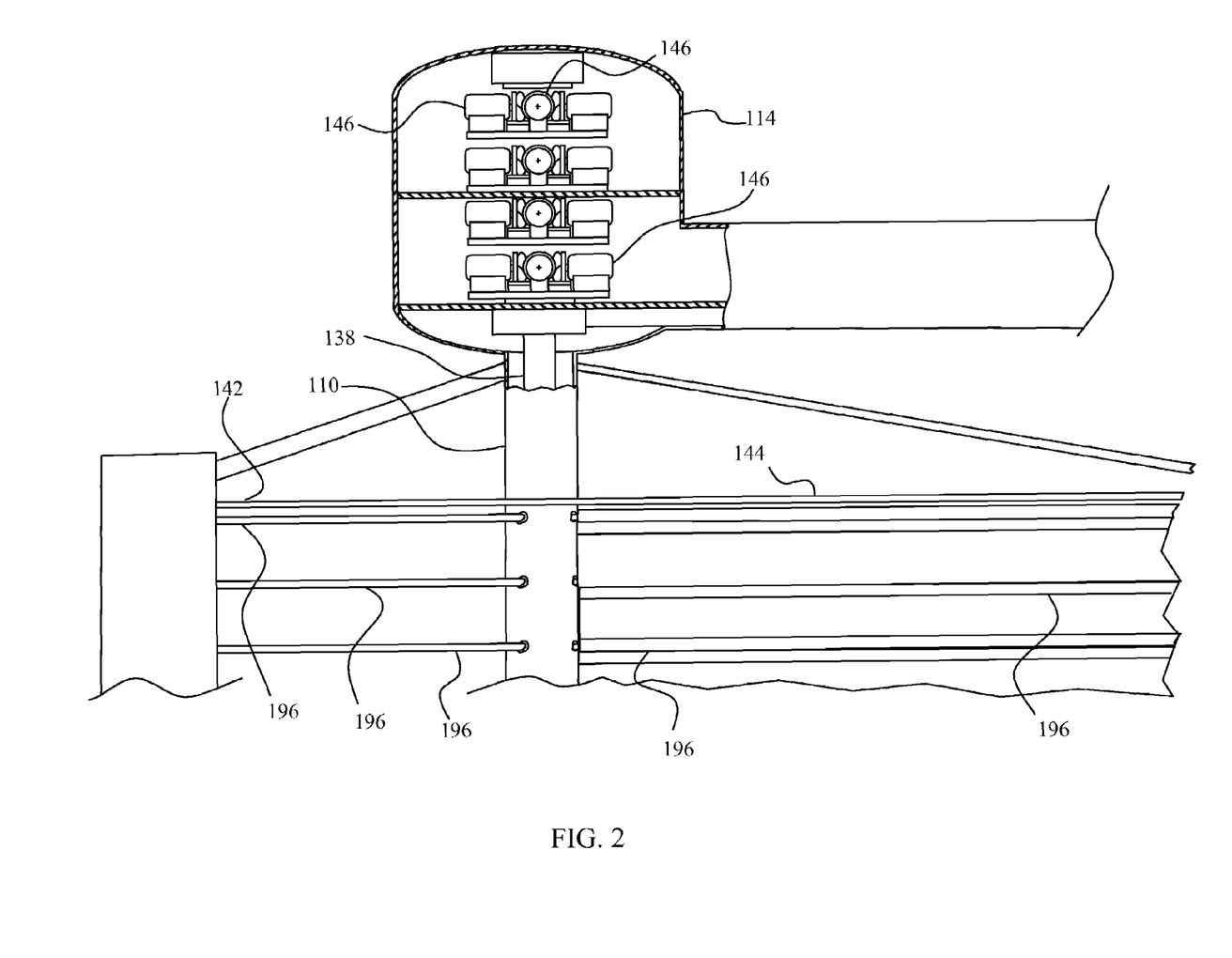
FIG. 2 shows a partial cutaway view of a generating node of the station of FIG. 1 showing a number of modular generators coupled to a plurality of universal gears through individually controllable clutch mechanisms.

The spar 110 and the spar 112 serve as housings for vertical drive shafts. With reference to FIGS. 1 and 2, a drive shaft 138 extends between the nodes 116 and 114. The drive shaft 138 is coupled to three louver panels 140, 142 and 144. The louver panels 140, 142 and 144 are rotatably supported by the spar 110. The drive shaft 138 drives a number of modular electrical generators such as modular generators 146. The spar 112 is similarly configured with louver panels 141, 143 and 145. Thus, in this embodiment each power generator node 114, 116, 118, and 120 houses sixteen stacked modular generator units.

The spar 108 is outfitted with instrumentation and blade/vane microprocessors that control closing of the various louver panels such as louver panels 140, 141, 142, 143, 144 and 145 in the proper sequence to maximize the extraction of kinetic energy from the water current and controls opening of the various louver panels in order to minimize the surface resistance of the louvers that are rotating back into the "driven position." The lower portion of this instrumentation spar 108 also provides a one-atmosphere scientific observation station.

Figure 3:
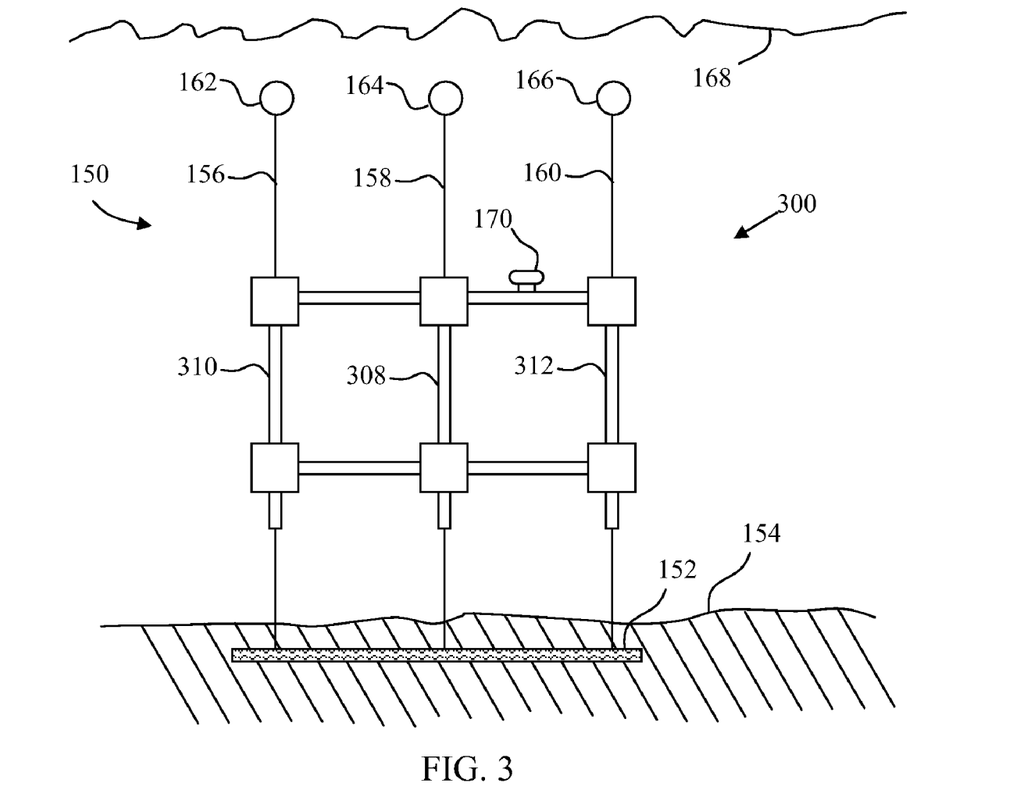
FIG. 3 shows schematic view of an anchoring and positioning system used with an alternative manned subsurface electric power generation station in accordance with principles of the present invention.

FIG. 3 shows an alternative station 300 with various components removed to more clearly show an anchoring and positioning system 150. The anchoring and positioning system 150 includes a massive circular "mud pad" type anchor 152 that is buried in the seafloor 154 using high-pressure water jets as is known to those of ordinary skill in the relevant art.

The system 150 further includes three stainless steel "tension leg" cables 156, 158 and 160 which extend from the mud pad 152 and are held in tension by respective redundant, syntactic foam filled, stainless steel subsurface buoys 162, 164 and 166. The length of the cables 156, 158 and 160 is selected such that the subsurface buoys 162, 164 and 166 are not maintained at a depth to pose a significant impediments to surface going vessels (under power or tow) in any sea state. Alternatively, the station 300 may be located in an area where fishing and navigation are restricted to avoid entanglement or damage. Each individual stainless steel tension leg cable 162, 164 and 166 passes through the corresponding vertical spar 310, 308 or 312 of the station 300. The cables 162, 164 and 166 of the system 150 are equipped with emergency buoyancy devices so any portions of damaged/fouled cable will float to the surface rather than sink and potentially entangle in the louver panels.

The anchoring and positioning system 150 further includes large spool winches and/or other suitable hydraulic traction devices (not shown) located inside each of the respective spars 308, 310 and 312. The anchoring and positioning system 150 submerges the station 300 to the selected operational depth by employing the winches to draw in cable and pull the station 300 toward the sea floor 154. Conversely, the winches may also be used to allow the station 300 to "crawl" from the selected operational depth up to the tension leg buoys 162, 164 and 166. The variable ballast tanks may be used to provide the station 300 with negative or positive buoyancy to reduce the load on the winches during these operations.

Additionally, the anchoring and positioning system 150 can rapidly semi-surface the station 300 to a shallow depth by releasing the cables 156, 158 and 160 and using the variable ballast tanks to provide a positive buoyancy. In either event, the station 300 may be positioned to just below the surface 168 of the ocean where it can be serviced by conventional diving equipment.

The station 300 also includes a tethered one-atmosphere "elevator" pod 170 that can be surfaced and submerged from the station 300 by releasing or retracting a cable from a cable winch mounted on the station 300. The pod 170 can be used for transporting equipment from the surface 168 to the submerged station 300. The pod cable is equipped with emergency buoyancy devices so any portions of damaged/fouled cable will float to the surface rather than sink and potentially entangle in the panels louver panels.

Returning to FIG. 1, the station 100 is further configured to produce large quantities of potable water. In addition to employing the louver panels to generate electric power, the system employs either generated electrical power or the mechanical force of the rotating louver panels 140, 141, 142, 143, 144 and 145 to power high pressure water pumps that pull in ambient sea water 660 through marine biology friendly (suction break) filters and to force the high pressure sea water through a reverse osmosis membrane to produce fresh potable water. Alternatively, the sea water may be distilled. If needed, the potable water may be micro gas chlorinated. The potable water is then available for consumption on station 100 during manned operations and/or may be pumped to a mainland water facility via buried pipelines.

The station 100 further includes a brine diffusion system, a holding tank that collects the brine ("flush") of the reverse osmosis process, and a pump that injects the brine into the brine diffusion system. The brine diffusion system includes long runs of perforated pipe and a pump that forces a strong flow of ambient seawater through the pipe. The system 400 injects the brine solution into the pipes in metered doses and the brine then diffuses into the surrounding sea water through the perforated piping in a controlled manner so as to not salt poison marine life. This ameliorates undesirable production of salt clouds in the water column that could be poisonous to marine life. Preferably, the brine diffusion piping is located downstream from the station 100.

Figure 4:
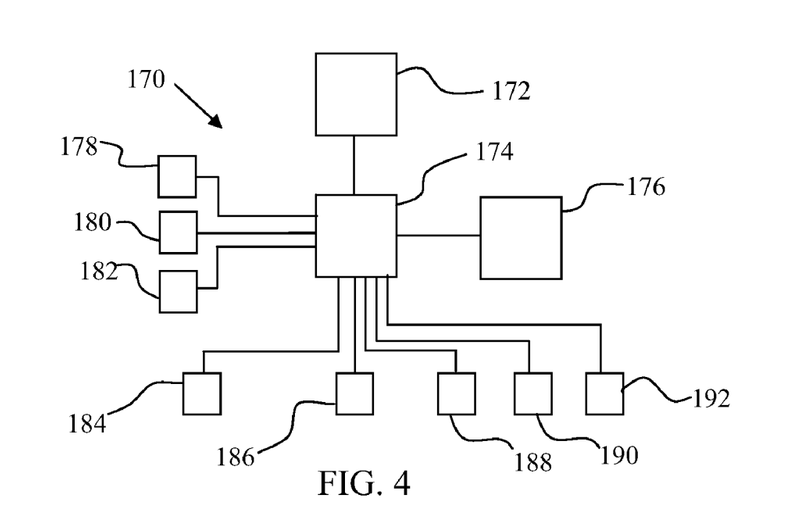
FIG. 4 shows a schematic view of a control network for the various subsystems of the manned station of FIG. 1 in accordance with principles of the present invention.

Operations of the station 100 are controlled through a station computer network 170 shown in FIG. 4. The network 170 includes a user interface 172, a microprocessor 174 and a memory 176. The microprocessor 174 is programmed to monitor and control various functions related to the operation of the station 100. By way of example, various sensors 178 associated with the production of power may be monitored. The sensors 178 in this embodiment include sensors that produce outputs corresponding to the rotational position of the louver panels 140, 141, 142, 143, 144 and 145.

The microprocessor 174 also monitors environmental conditions through sensors 180 including atmospheric conditions within the station 100. The sensors 182 provide signals corresponding to conditions upstream of the station 100. The sensors 182 in this embodiment are AQUADOPP® current meters commercially available from NortekUSA of Annapolis, Md. The sensors 182 provide outputs indicative of water temperature and water velocity. The sensors 182 are located in the current path upstream of the station 100.

The microprocessor 74 is further programmed to provide various control functions. By way of example, the microprocessor 174 provides control signals to various systems 184 used to maintain the environment of the station 100 habitable. The systems 184 include the heating, ventilation and air conditioning systems. The microprocessor further controls the machinery associated with fire suppression systems 186, communication systems 188, and auxiliary systems 190.

The microprocessor further controls various systems 192 associated with power generation including control of the louver panels. Control of the louver panels is described with reference to FIG. 5. The water current is moving in the direction indicated by the arrow 194. The speed of the current is sensed by the sensors 182 and a signal is passed to the microprocessor 174. A signal indicative of the position of the louver panels 140, 141, 142, 143, 144, and 145 is passed to the microprocessor 174 from the sensors 178. The microprocessor 174 is programmed compute a projected impact time based upon the received input for each of the louver panels 140, 141, 142, 143, 144, and 145.

Figure 5:
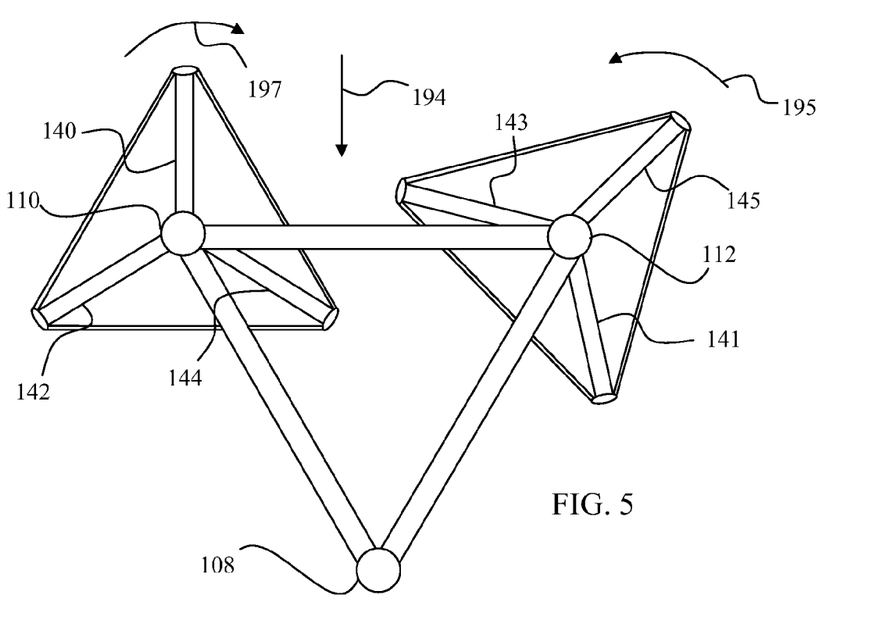
FIG. 5 shows a top plan view of the station of FIG. 1.

In other words, as the louver panels 140, 141, 142, 143, 144, and 145 rotate about the spars 110 and 112 in the direction indicated by arrows 195 and 197, the microprocessor 174 projects the time at which a line drawn from the respective spar 110 or 112 through the louver panels 140, 141, 142, 143, 144, and 145 is pointed directly toward the direction from which the current is coming (referred to herein as aligned with the current). In FIG. 5, the louver panel 140 is nearly aligned with the current. Thus, as the louver panels 140, 141, 142, 143, 144, and 145 continue to rotate past the point at which they are aligned with the current, the microprocessor 174 issues a control signal which causes the louvers 146 on the particular louver panel to move to a closed position, creating a relatively large surface for receiving kinetic energy from the current.

The current continues to provide force against the closed louver panels until the louver panel is aligned with the current on the downstream side. In FIG. 5, the louver panel 141 is nearly aligned with the current on the downstream side. Beyond this position, any force of the current on the louver panel acts to slow the rotation of the louver panels. Accordingly, the microprocessor 174 issues a control signal causing the louvers 196 (see FIG. 2) on panels that are aligned with the current on the downstream side to open thereby reducing the effective surface area of the louver panel.

Those of ordinary skill in the art will further appreciate that the torque on the station 100 from the louver panels 141, 143 and 145 are countered by the torque on the station 100 from the louver panels 142, 144 and 146.

In one embodiment, the microprocessor 174 is configured to determine predictive "attack angle" and "rate of attack." This calculation incorporates the rotational speed of the louver panels along with the transition speed of the louvers between the open and closed position to optimize the rotational speed of the louver panels.

The microprocessor 174 may further be used to control the louvers 196 to a "full feather" position wherein the controlled louvers 196 move to a full open position to aid in slowing/stopping rotation of the louver panels. Another controlled position is a "full tilt" position where all of the louvers 196 on each of the louver panels are controlled to a fully closed position to provide relatively low vertical resistance when changing the depth of the station 100 such as for semi-surfacing the station 100 for repairs. The louvers 196 may further be controlled to a "selective feather" position where one of the louvers 196 is set to a full open position and locked to allow repair of the motion control system for that louver while the rest of the louvers continue to function as normal in power generation.

Figure 6:
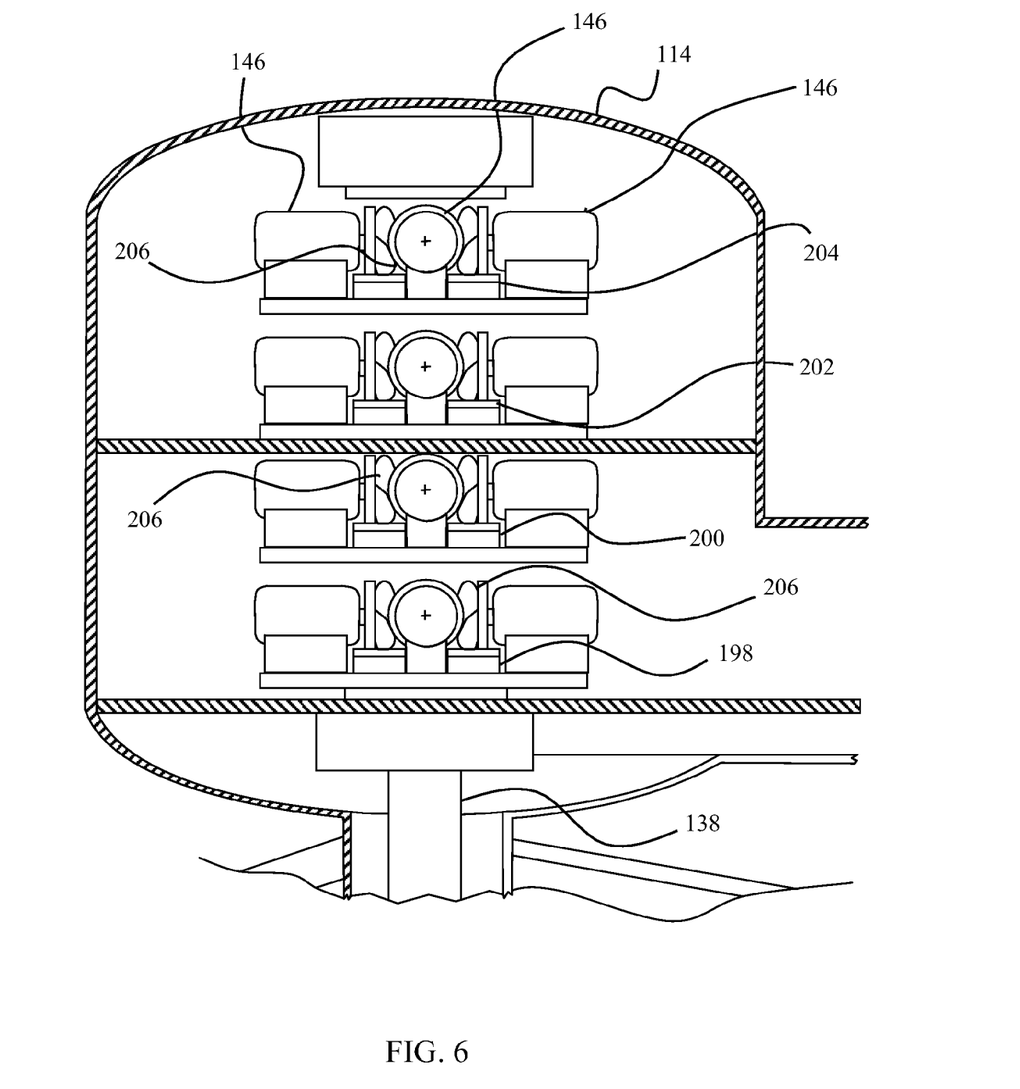
FIG. 6 is a partial cutaway view of the station of FIG. 1 showing additional detail of the power generating node of FIG. 2.

The microprocessor 174 also provides control functions for the power generation equipment in the power generating nodes 114, 116, 118 and 120. Referring to FIG. 6, the power generating node 114 includes four levels of modular generators 146. Each level includes four modular generators 146 arranged about the power axle 138. The power axle 138 is coupled to four universal gears 198, 200, 202 and 204. Each of the generators 146 is coupled to the universal gear 198, 200, 202 or 204 that is on the same level as the modular generator 146 by a clutch 206. The microprocessor 174 issues control signals for engaging or disengaging the individual clutches 206. Accordingly, each of the modular generators 146 may be individually removed from operation to perform maintenance or for replacement without affecting the operation of the remaining thirty-one modular generators 146 in the generating node 114.

Figure 7:
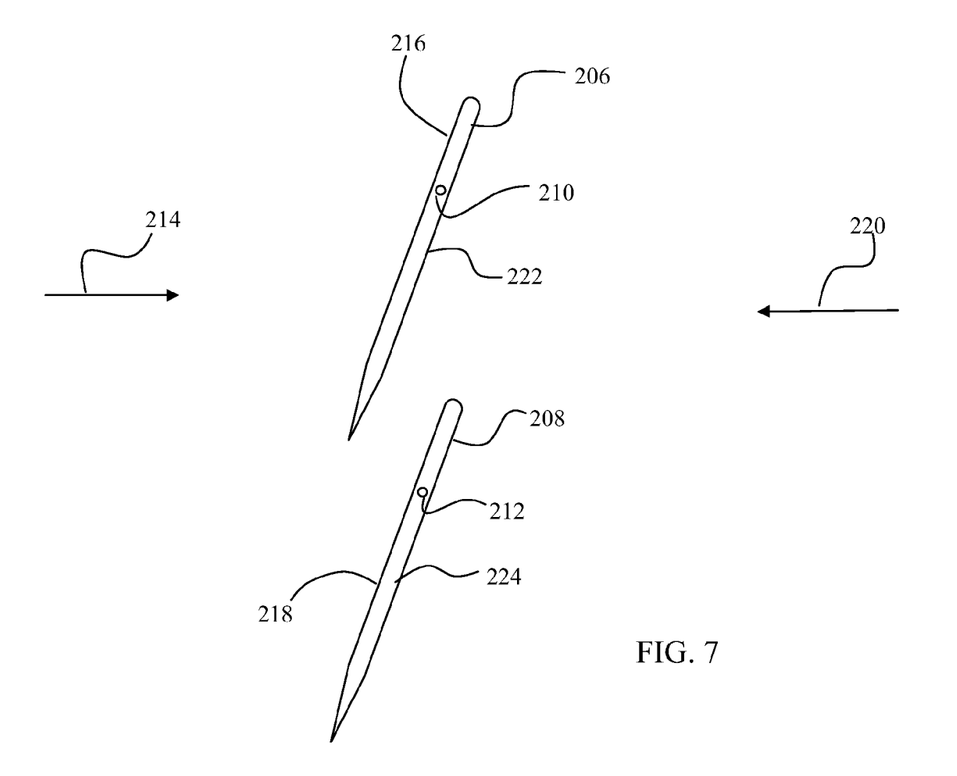
FIG. 7 shows a schematic of the placement of crossbars with the louvers used in the louver panels of the station of FIG. 1 which reduce the need for maintenance on the louvers.

Maintenance concerns also factor into the construction of the louvers 196. By way of example, FIG. 7 shows a schematic view of a louver 206 and a louver 208. The position of the louvers 206 and 208 are controlled through crossbars 210 and 212, The crossbars 210 and 212 are positioned such that the louvers 206 and 208 are somewhat cantilevered toward an open position when current flowing in the direction of the arrow 214 impacts the front surfaces 216 and 218, respectively. Conversely, when current flowing in the direction of the arrow 220 impacts the back surfaces 222 and 224, the louvers 206 and 208, respectively, experience a force moving them toward a closed position. This configuration increases the operational efficiency of the louver panels and reduces the forces on the systems used to control the louvers. The louvers 206 and 208 in this embodiment are also configured to be neutrally buoyant when the station 100 is at the desired depth. Thus, less force is placed upon the various components further reducing maintenance requirements.

Figure 8:
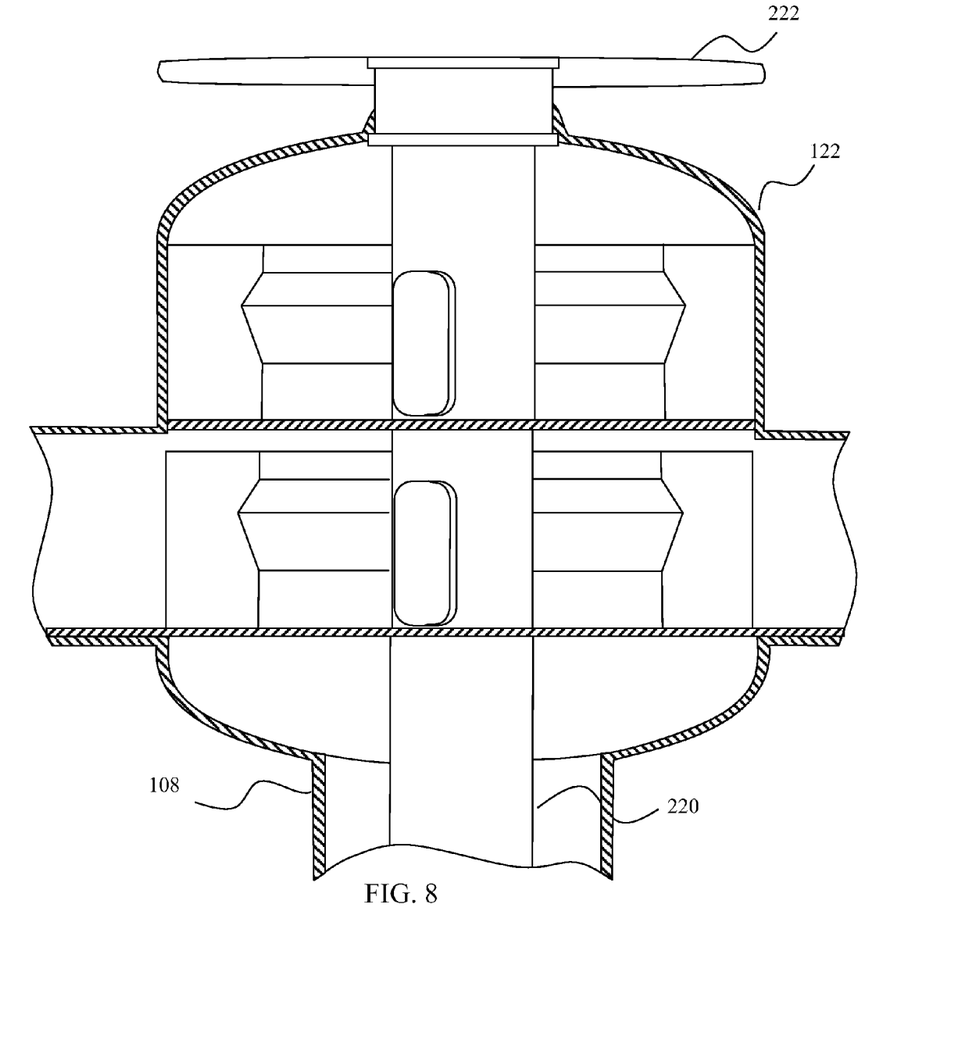
FIG. 8 shows a partial cutaway view of the dry transfer node and elevator system of the station of FIG. 1.

The auxiliary systems 190 controlled by the microprocessor 174 include an elevator system provided in the spar 108. As shown in FIG. 8, the spar 108 encloses an elevator shaft 220 which extends between the node 122 and the node 124. The elevator allows for movement of personnel, supplies and equipment between the upper structure 104 and the lower structure 106. The spars 126, 128, 130, 132, 134 and 136 may further be supplied with tracks or guide rails for use in moving equipment or supplies throughout the station.

The elevator shaft is located beneath a dry water skirt 222. The transfer skirt 222 is configured to be used with a vehicle equipped with a high pressure water sweep and a rotary scrub brush. The high pressure water sweep and rotary scrub brush are used to clear biofouling and other debris from the dry transfer skirt 222. The vehicle then settles onto the dry transfer skirt 222 with the aid of stab pins to provide for proper alignment. A seal on the underside of the vehicle provides a watertight seal between the vehicle and the dry transfer skirt 222. Once the vehicle is properly positioned, the space within the seal and between the vehicle and the dry transfer skirt 222 is dewatered. The dewatering process lowers the pressure between the vehicle and the dry transfer skirt 222. Accordingly, a tight seal is maintained by the force of the ambient sea pressure acting upon the vehicle.

In accordance with one embodiment, the station 100 is situated at a water depth of 650 to 2,500 feet of seawater ("FSW"). This depth places the station 100 well below the mean water surface in a 100-year storm risk scenario. When incorporating the anchoring and positioning system 150 in 650 FSW, the mud pad 152 is buried at a depth of around 45 feet below the seafloor 154 and the three subsurface buoys 162, 164 and 166 that terminate the respective stainless steel tension leg cables 156, 158 and 160 are at a minimum of depth of around 165 FSW, still below the mean water surface in a 100-year storm risk scenario.

A manned submersible may be used to effect crew changes, delivery of food, hard mail, replacement parts, and to remove sick or injured station workers, and to deliver and replace scientists visiting the scientific observation station. Thusly located well below the "action layer" of the ocean, the station 100 is not significantly impacted by adverse surface/semi-surface conditions such as tsunamis, hurricanes, solar flares, war, etc. The station 100 is thusly also a difficult target for potential terrorism. Further, it should be noted that the louver panels 140, 141, 142, 143, 144 and 145 may open, close, and rotate slowly enough to ameliorate adverse impacts on marine life. The station 100 also includes an underwater sound broadcasting system configured to produce sounds at levels and frequencies to induce aversion/diversion maneuvers in most forms of marine life. The impact of invertebrates (jellyfish, etc.) on the support columns, and blade surfaces would be comparable to the impact seen on offshore oil production structures or sunken ships.

Additionally, in operation the station 100 may provide an auxiliary power dock for submarines to fill their power and fresh water needs during a "submerged power down of their onboard power plants for repair/maintenance, and the station 100 may provide a high voltage power source for long range hydrophonic sub-sea listening/tracking/signal repeating systems.

Additionally, as the station 100 is substantially a large metal structure submerged in reasonably cool water (i.e., on the order of 39 degrees F. at a depth of around 650 FSW), the temperature of the ambient water 660 facilitates cooling of the rotating parts with the heat exchangers.

While the present invention has been illustrated by the description of exemplary processes and system components, and while the various processes and components have been described in considerable detail, applicant does not intend to restrict or in any way limit the scope of the appended claims to such detail. Additional advantages and modifications will also readily appear to those ordinarily skilled in the art. The invention in its broadest aspects is therefore not limited to the specific details, implementations, or illustrative examples shown and described. Accordingly, departures may be made from such details without departing from the spirit or scope of applicant's general inventive concept.

We claim:

1. A subsurface power generating system comprising:
    a first power generating node, the first power generating node including
        at least one cross-flow turbine;
        at least one universal gear coupled to the at least one cross-flow turbine;
        at least one modular generator; and
        at least one clutch for engaging and disengaging the at least one modular generator and the at least one universal gear.

2. The system of claim 1, wherein the at least one cross-flow turbine comprises a first plurality of louvers, the system further comprising:
    a controller operatively coupled to the first plurality of louvers and configured to move the first plurality of louvers from a first position to a second position.

3. The system of claim 2, wherein:
    the at least one cross-flow turbine further comprises
        a power axle operably connected to the at least one universal gear and the first plurality of louvers,
        a second plurality of louvers, and
        a third plurality of louvers, each of the second plurality of louvers and the third plurality of louvers adjacent to the first plurality of louvers and operably coupled to the power axle, the first, second and third plurality of louvers equally spaced about the power axle; and
    the controller is operatively coupled to the second plurality of louvers and the third plurality of louvers and configured to control each of the second plurality of louvers and the third plurality of louvers from a first position to a second position.

4. The system of claim 2, further comprising:
    a power axle operably connected to the at least one universal gear and the first plurality of louvers;
    at least one current sensor for sensing the speed of a current, the at least one current sensor remote from the at least one cross-flow turbine; and
    a position sensor for providing an output for determining the location of the first plurality of louvers, wherein the controller is further configured to determine a projected time at which the sensed current will contact the first plurality of louvers based upon the sensed speed of the current and the position sensor output and control the first plurality of louvers from the first position to the second position based upon the projected contact time.

5. The system of claim 4, wherein:
    the first plurality of louvers extend radially from the power axle; and
    each of the first plurality of louvers includes a leading portion and a trailing portion, such that the leading portion and the trailing portion define a line that is substantially aligned with the axis of the power axle in the first position and the leading portion and the trailing portion define a line that is substantially cross-wise to the axis of the power axle in the second position.

6. The system of claim 2, wherein each of the first plurality of louvers includes a front portion and a back portion, the at least one cross-flow turbine further comprising:
    a plurality of crossbars, each of the plurality of crossbars rotatably coupling a respective one of the first plurality of louvers to the power axle, each of the plurality of crossbars defining an axis of rotation for each of the respective first plurality of louvers such that each of the first plurality of louvers is cantilevered toward the second position from the first position in response to a current contacting the back portion of each of the first plurality of louvers and cantilevered toward the first position from the second position in response to the current contacting the front portion of each of the plurality of louvers.

7. The system of claim 6, wherein each of the first plurality of louvers is neutrally buoyant when the subsurface power generating system is located at an operating depth.

8. The system of claim 1, wherein:
the at least one modular generator comprises a plurality of modular generators and
the at least one clutch comprises a plurality of clutches, each of the plurality of clutches associated with a respective one of the plurality of modular generators for engaging and disengaging the universal gear with each of the plurality of modular generators.

9. The system of claim 1, wherein:
the at least one universal gear comprises a plurality of universal gears coupled to the turbine;
the at least one modular generator comprises at least one modular generator for each of the plurality of universal gears; and
the at least one clutch comprises a plurality of clutches, each of the plurality of clutches associated with a respective one of the at least one modular generator for each of the plurality of universal gears, for engaging and disengaging each of the plurality of universal gears with each of the at least one modular generator for each of the plurality of universal gears.

10. The system of claim 1, wherein the first cross-flow turbine is configured to rotate in a clockwise direction, the system further comprising:
a second power generating node, the second power generating node including,
at least one cross-flow turbine configured to rotate in a counterclockwise direction;
at least one universal gear coupled to the at least one cross-flow turbine;
at least one modular generator; and
at least one clutch for engaging and disengaging the at least one modular generator to the at least one universal gear.

* * * * *